US008320760B1

(12) United States Patent
Lam et al.

(10) Patent No.: US 8,320,760 B1
(45) Date of Patent: Nov. 27, 2012

(54) PASSIVE OPTICAL NETWORK WITH ASYMMETRIC MODULATION SCHEME

(75) Inventors: Cedric F. Lam, Milpitas, CA (US); Hong Liu, Palo Alto, CA (US); Ryohei Urata, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/288,555

(22) Filed: Nov. 3, 2011

(51) Int. Cl.
    *H04J 14/00* (2006.01)
(52) U.S. Cl. .............................. 398/66; 398/68; 398/70
(58) Field of Classification Search .............. 398/34–35, 398/66–72, 115–117
    See application file for complete search history.

(56) References Cited

U.S. PATENT DOCUMENTS

| | | | |
|---|---|---|---|
| 5,926,298 A | 7/1999 | Li | |
| 2009/0060521 A1* | 3/2009 | Lin et al. | 398/140 |
| 2009/0202246 A1* | 8/2009 | Kashima | 398/77 |
| 2010/0054740 A1* | 3/2010 | Lee et al. | 398/68 |
| 2010/0142955 A1* | 6/2010 | Yu et al. | 398/72 |
| 2010/0196011 A1* | 8/2010 | Liu et al. | 398/79 |
| 2011/0182578 A1* | 7/2011 | Cavaliere | 398/58 |
| 2011/0236017 A1* | 9/2011 | Ohlen | 398/34 |
| 2011/0262131 A1* | 10/2011 | Gottwald et al. | 398/41 |
| 2011/0274433 A1* | 11/2011 | Presi et al. | 398/97 |

OTHER PUBLICATIONS

"Optical Network Management System, Remote Testing, Network Monitoring, and Service Provisioning Solution for High-Quality Network Performance", Retrieved from the internet: <http://www.jdsu.com/ProductLiterature/onms_br_fop_tm_ae.pdf>, 2005, 8 pages, JDSU Uniphase Corporation.

NetCracker, "Comprehensive Telecom Operations and Management Solutions, Product Overview", 2010, 2 pages, NetCracker Technology Corp.
"ONMS PON Centralized Remote PON Test System", <http://www.jdsu.com/product-literature/onmspon_br_fop_tm_ae.pdf>, Jun. 2009, 4 pages, JDSU Uniphase Corporation.
"Homodyne detection", From Wikipedia, the free encyclopedia, <http://en.wikipedia,org/wiki/Homodyne_detection> retrieved from Internet on Jul. 11, 2011, 1 page.
Optical heterodyne detection, From Wikipedia, the free encyclopedia, <http://en.wikipedia.org/wiki/Optical_heterodyne_detection> retrieved from Internet on Jul. 11, 2011, 5 pages.
Lam, Cedric F., "Installation of Fiber-to-the-Premise Using Optical Demarcation Devices", U.S. Appl. No. 12/941,766, filed Nov. 8, 2010.
Lam, Cedric F., "Fiber Diagnosis System for Point-to-Point Optical Access Networks", U.S. Appl. No. 12/985,041, filed Jan. 5, 2011.

(Continued)

*Primary Examiner* — Dzung Tran
(74) *Attorney, Agent, or Firm* — Blakely Sokoloff Taylor & Zafman LLP (57) ABSTRACT

A passive optical network couples a WDM optical line terminal ("OLT") to WDM optical network units ("ONUs"). The WDM OLT includes an optical transmitter array with coherent transmitters to generate downstream WDM signals encoded using phase modulation, an optical receiver array with direct detection photo-detectors to receive upstream WDM signals encoded with amplitude modulation, and an optical diplexer optically coupled to the optical transmitter array and the optical receiver array. The WDM ONU includes a tunable optical transmitter having a first tunable laser source coupled to generate a selectable upstream carrier wavelength and direct amplitude modulation circuitry coupled to amplitude modulate the first tunable laser source and a tunable optical receiver having coherent detection circuitry to demodulate phase information from the downstream WDM signals and a second tunable laser source operated as a local oscillator and coupled to tune to a selectable downstream carrier wavelength.

22 Claims, 8 Drawing Sheets

OTHER PUBLICATIONS

Lam, Cedric F., "Detection of Fiber Faults in Optical Fiber Networks", U.S. Appl. No. 13/040,983, filed Mar. 4, 2011.

Lam, Cedric F., "Migratable Wavelength Division Multiplexing Passive Optical Network", U.S. Appl. No. 13/205,055, filed Aug. 8, 2011.

Hamacher, M. et al., "Coherent Receiver Front-End Module Including a Polarization Diversity Waveguide OIC and a High-Speed InGaAs Twin-Dual p-i-n Photodiode OEIC Both Based on InP," IEEE Photonics Technology Letters, vol. 4, No. 11, Nov. 1992, pp. 1234-1237.

* cited by examiner

PASSIVE OPTICAL NETWORK WITH ASYMMETRIC MODULATION SCHEME

TECHNICAL FIELD

This disclosure relates generally to optical networks, and in particular but not exclusively, relates to wavelength division multiplexing optical access networks and time division multiplexing optical access networks.

BACKGROUND INFORMATION

Fiber-to-the-home (FTTH) has been regarded as the ultimate form of broadband access offering very high bandwidth to end-users. Today's FTTH systems are mostly offered through point-to-multipoint time division multiplexed (TDM) passive optical networks (PONs) using a 1:N power splitter (e.g., Ethernet-PON, Gigabit-PON, and 10G versions of these systems) at a remote node (RN) in the field to share a common transceiver at the central office (CO), or through point-to-point (pt-2-pt) optical Ethernets with individual home-run fibers.

The upstream and downstream signals of a TDM-PON are transmitted using different optical wavelengths (usually 1310 nm for upstream transmission and 1490 nm for downstream transmission). The TDM-PON media access controller (MAC) within the CO schedules the transmission between the CO transceiver (TRX) and the end users by assigning appropriate time slots to each end user. A TDM-PON provides beneficial savings in the number of trunk fibers (between RN and CO) and optical transceiver counts at the CO while saving patch panel space to terminate fibers, but does not scale well with bandwidth growth. The bandwidth per household is often oversubscribed as the bandwidth per optical line terminal (OLT) TRX at the CO is shared among all optical network units (ONUs) connected to the given OLT TRX. To support Gb/s per user transmission speeds on a TDM-PON can require >10 Gb/s transceivers at each ONU. Thus, high-speed transmissions can be both technologically challenging and expensive.

Pt-2-pt optical networks provide very high bandwidths to end users, but do not scale well with optical fiber termination at the CO and fiber counts. Rather, pt-2-pt optical networks result in large numbers of trunk lines and transceivers and fiber terminations in the CO. This usually results in greater space requirements, higher power, and increased capital expenses.

A wavelength division multiplexed (WDM) PON is another approach, which provides the benefit of fiber consolidation and pt-2-pt virtual links to end-users by assigning separate wavelengths between the CO and individual users. It can offer the benefits of both TDM-PON and pt-2-pt architectures. Traditional WDM-PON systems use a wavelength demultiplexer (as opposed to the power splitter used in TDM-PON) at the RN in the field to distribute a separate wavelength to end-users. To upgrade a conventional TDM-PON to a WDM-PON currently involves replacing the power splitter in the RN with the wavelength multiplexer and replacing all TDM-ONUs at user premises with WDM-ONUs. This all or nothing upgrade is a sort of fork-lifting upgrade that is not only cumbersome but also disruptive to current subscribers and difficult to coordinate. In addition, current WDM wavelength-multiplexers fix the wavelength spacing and optical spectrum at deployment time and constrain future spectral flexibility. In other words, conventional WDM-PON systems use a fixed wavelength plan which is difficult to change after deployment.

Despite its promise, WDM-PON technologies are still maturing and have not yet achieved mainstream adoption. As such, it is important to have a migration strategy to upgrade TDM-PON systems to WDM-PONs seamlessly with minimum disruption to the existing TDM-PON users. Such a system should support coexistence of TDM-PON and WDM-PON architectures during the migration period.

BRIEF DESCRIPTION OF THE DRAWINGS

Non-limiting and non-exhaustive embodiments/implementations of the invention are described with reference to the following figures, wherein like reference numerals refer to like parts throughout the various views unless otherwise specified.

DETAILED DESCRIPTION

Embodiments of a system, apparatus, and technique for implementing a passive optical network using an asymmetric modulation scheme, which is capable of being combined within a hybrid optical access network supporting both time division multiplexing and wavelength division multiplexing are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Fiber-to-the-home ("FTTH") is a broadband access network infrastructure, capable of supporting long-term economic growth. One option for implementing an FTTH access network uses a passive optical network ("PON") architecture. A PON is a point-to-multipoint optical network that uses unpowered or passive optical splitters/multiplexers to enable one or two fibers to server multiple customer premises ("CPs") (e.g., 32 to 128 customer premises). Another option for FTTH is to string a separate homerun fiber from a carrier central office ("CO") all the way to each CP. Such architecture is called a point-2-point architecture (pt-2-pt) as opposed to PON's point-to-multipoint architecture.

Figure 1:
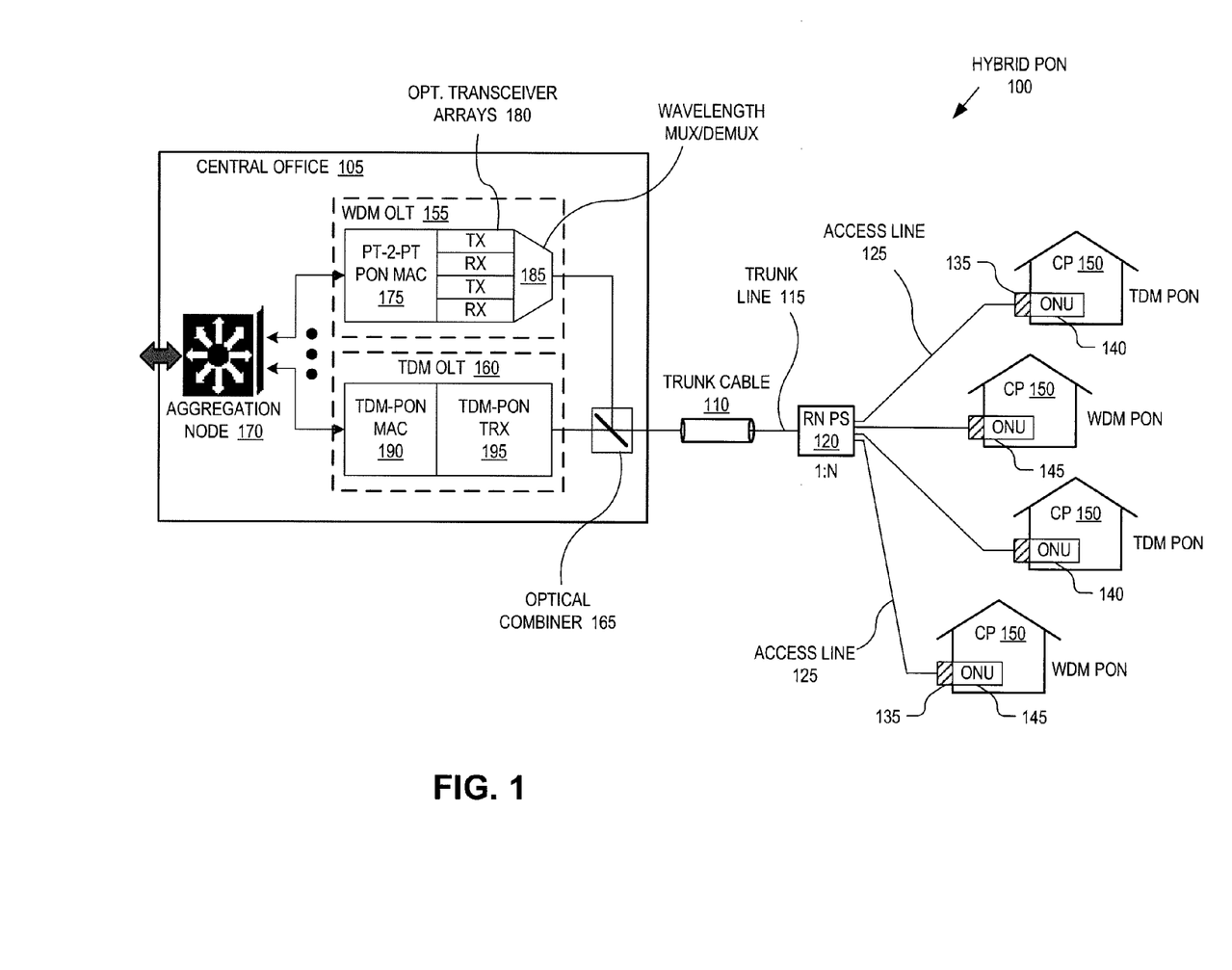
FIG. 1 is a functional block diagram illustrating a hybrid passive optical network ("PON") system, in accordance with an implementation of the disclosure.

FTTH deployment is so capital intensive that many broadband access infrastructure providers are feverishly looking for methods to lower the deployment cost and migration from existing PON technologies (e.g., TDM-PON) to more advanced PON technologies (e.g., WDM-PON). FIG. 1 is a functional block diagram illustrating a hybrid PON system 100 capable of facilitating a seamless migration from an existing TDM-PON access network infrastructure to a WDM-PON access network infrastructure, in accordance with an implementation of the disclosure. Hybrid PON system 100 is capable of concurrently servicing TDM optical network units ("ONU") and WDM ONUs over a single fiber trunk line and remote node ("RN") power splitter. Hybrid PON system 100 facilitates a virtually seamless transition from TDM-PON architecture to WDM PON architecture. Existing TDM CPs can continue to operate using their existing customer premise equipment (e.g., TDM ONUs), while new CPs can be added and given advanced WDM ONUs. The two technologies can be operated concurrently within hybrid PON system 100 indefinitely or until such time as the conventional TDM ONUs are swapped out in a controlled and organized manner that limits disruptions to existing end-users and provides timing flexibility.

The illustrated implementation of hybrid PON system 100 includes a CO 105, a trunk cable 110, a trunk line or trunk fiber strand 115 inside the trunk cable 110, and a RN power splitter 120, access lines 125, demarcation points 135, and TDM ONUs 140 and WDM ONUs 145 at CPs 150. The illustrated implementation of CO 105 includes a WDM optical line terminal ("OLT") 155, a TDM OLT 160, an optical combiner 165, and an aggregation node 170. The illustrated implementation of WDM OLT 155 includes a pt-2-pt PON media access controller ("MAC") 175, an optical transceiver array 180, and a wavelength interleaving multiplexer/demultiplexer ("MUX/DEMUX") 185. The illustrated implementation of TDM OLT 160 includes a TDM-PON MAC 190 and a TDM-PON transceiver 195.

Trunk line 115, RN PS 120, and access lines 125 that couple to WDM ONUs 145 may be considered to make up a WDM PON or WDM sub-PON, while the trunk line 115, RN PS 120, and access lines 125 that coupled to TDM ONUs 140 may be considered to make up a TDM PON or TDM sub-PON, and collectively trunk line 115, RN PS 120 and all access lines 125 may be referred to as a hybrid PON. WDM OLT 155 and TDM OLT 160 serve as the service provider's endpoint at CO 105 for their respect sub-PONs. Each OLT serves two primary functions: 1) performing optical-to-electrical and electrical-to-optical conversions between the service provider's equipment and their respective sub-PON and 2) coordinating multiplexing with the ONUs at the other end of their respective sub-PONs. Of course, WDM OLT 155 performs wavelength division multiplexing between ONUs 145 and TDM OLT 160 performs time division multiplexing between ONUs 140. Each WDM OLT 155 and TDM OLT 160 may service a number of CPs 150 (e.g., 32, 64, 128, etc.) while a single CO 105 may services thousands of CPs 150 (e.g., 50,000). Thus, while FIG. 1 illustrates CO 105 as including just one WMD OLT 155 and one TDM OLT 160, in practice, CO 105 may include many paired WDM OLTs 155 and TDM OLTs 160 with their respective MACs 175 or 190 multiplexed via aggregation node 170.

Trunk cable 110 including trunk fiber strand 115 extends from CO 105 to RN power splitter 120 located within a neighborhood of CPs 150, which represent potential or existing customers of the service provider. From RN power splitter 120, individual fiber access lines 125 extend to corresponding CPs 150. Access lines 125 may be terminated at demarcation points 135. The demarcation point 135 may be located on a side of the CP where the fiber access line enters the building or in an access box or hand hole near the customers property line (e.g., in a utility right-of-way). Demarcation points 135 provide a well-defined demarcation identification point between the customer premise equipment ("CPE") including TDM ONU 140 and/or WDM ONU 145 and the carrier's fiber plant. Demarcation points 135 may serve to demark the terminal point of maintenance responsibility for the carrier. Both trunk cable 110 and access lines 125 may run along a utility right-of-way running adjacent to a neighborhood street. Trunk cable 110 and access lines 125 may be a subterranean fiber plant, a suspended fiber plant (e.g., suspended along telephone poles), or otherwise.

ONUs 140 and 145 serve as the CPE endpoint at CPs 150 and perform the primary function of performing optical-to-electrical and electrical-to-optical conversions. ONUs 140 and 145 link to a paired set of WDM OLT 155 and TDM OLT 160 at CO 105 via a single RN power splitter 120, trunk fiber strand 115 and optical combiner 165. All downstream signals (signals propagating along the optical direction extending from CO to CP) received from both WDM OLT 155 and TDM OLT 160 are broadcast on all downstream ports (ports optically facing CPs) of RN power splitter 120 towards CPs 150. All upstream signals (signals propagating along the optical direction extending from CP to CO) received from either TDM ONUs 140 or WDM ONUs 145 are combined by RN power splitter 120 onto a single upstream port (ports optically facing the CO) for delivery to CO 105 via trunk fiber strand 115 and optical combiner/splitter 165. As discussed in further detail below, although the downstream WDM signals are broadcast to all access lines 125, each WDM ONU 145 includes tunable optical coherent transceiver circuitry that selects only the wavelength(s) it is intended to receive. The tunable optical transceiver circuitry avoids the need for unique, per user, tunable filters on each access line 125 linked to a different WDM ONU 145. These tunable filters can be expensive. Since the TDM signals are time multiplexed broadcast signals, each TDM ONU 140 includes the same optical filter as all other TDM ONUs 140, which passes the upstream and downstream TDM wavelengths (typically 1310 nm upstream and 1490 nm downstream). The WDM ONUs 145 may also include an inexpensive common filter that simply blocks the TDM wavelengths, or may exclude even these filters due to their inherent wavelength selectivity.

Figure 2A:
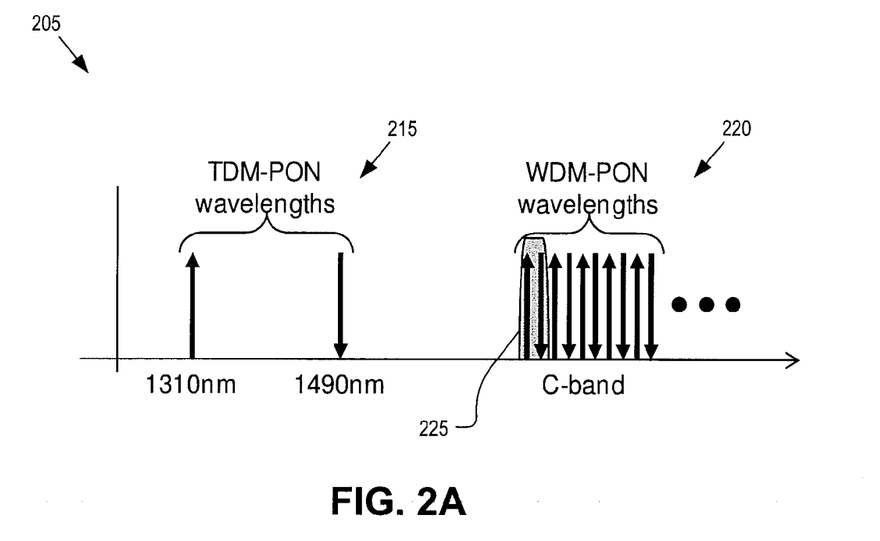
FIG. 2A is a chart illustrating time division multiplexing ("TDM") PON wavelengths and wavelength division multiplexing ("WDM") PON wavelengths of a hybrid PON, in accordance with an implementation of the disclosure.

FIG. 2A is a chart 205 illustrating an example wavelength allocation or hybrid PON wavelength grid for the TDM and WDM signals. It should be appreciated that FIG. 2A is merely demonstrative and other wavelengths or bands may be allocated to the TDM and WDM signals than those illustrated. The TDM signals are allocated according to a TDM-PON wavelength grid 215 while the WDM signals are allocated according to a WDM-PON wavelength grid 220. As illustrated, TDM-PON wavelength grid 215 includes just two wavelengths—an upstream wavelength and a downstream wavelength. The downstream wavelength is broadcast to all TDM ONUs 140. In contrast, the WDM-PON wavelength grid 220 includes many upstream and downstream wavelengths (e.g., 32 upstream wavelengths and 32 downstream wavelengths having a 50 GHz wavelength spacing between upstream and downstream wavelengths, and 100 GHz wavelength spacing between neighboring upstream or neighboring downstream wavelengths). In one implementation, the WDM-PON wavelength grid 220 allocates the wavelengths such that consecutive communication wavelengths are alternatively assigned between downstream and upstream WDM signals. In one implementation, the WDM-PON wavelength grid 220 is further allocated such that each WDM ONU 145 is allocated adjacent communication wavelengths. For example, adjacent upstream/downstream wavelengths 225 may be allocated to a single CP 150. Of course, a single CP 150 may be allocated additional bandwidth by allocating more than a block of two communication wavelengths (e.g., by allocating 4, 6, etc.).

Figure 2B:
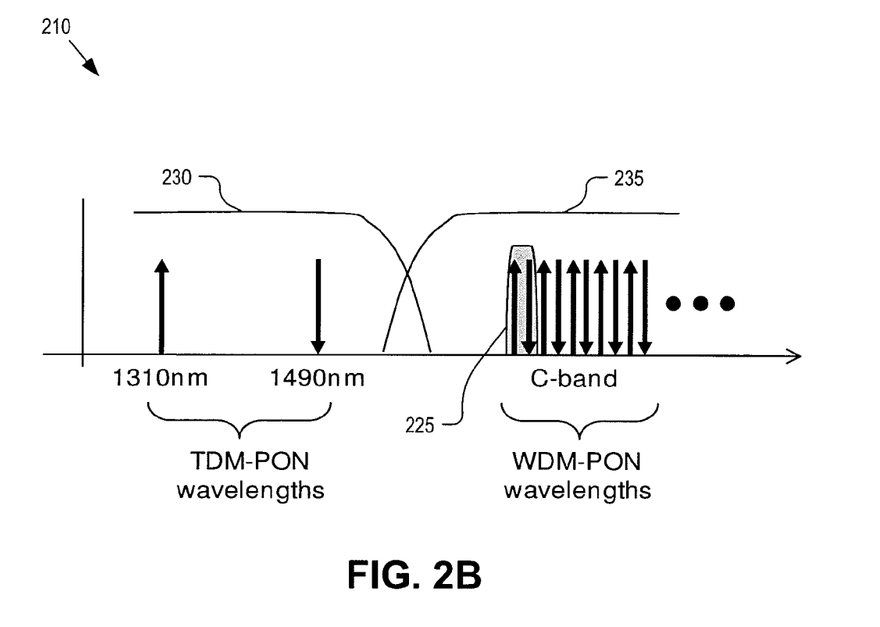
FIG. 2B is a chart illustrating pass-bands of an optical combiner, in accordance with an implementation of the disclosure.

In the implementation of FIG. 1, the TDM and WDM signals are delivered to RN power splitter 120 over a single trunk fiber strand 115. As such, an optical combiner 165 is located at the CO 105 to combine the TDM and WDM signals arriving at and departing from the WDM OLT 155 and TDM OLT 160. FIG. 2B is a chart 210 illustrating pass-bands of optical combiner 165, in accordance with an implementation of the disclosure. In the illustrated implementation, optical combiner 165 is a band combiner that includes a first pass-band 230 for directing TDM signals and a second pass-band 235 for directing WDM signals. TDM signals that fall within pass-band 230 are permitted to pass through optical combiner 165 in either the upstream or downstream direction to travel between TDM OLT 160 and trunk fiber strand 115. Conversely, downstream WDM signals that fall within pass-band 235 are coupled into trunk fiber strand 115 in the downstream direction and upstream WDM signals within pass-band 235 are separated from the TDM signals and reflected towards WDM OLT 155. In one embodiment, optical combiner 165 is implemented using a dichroic filter that is substantially transparent in pass-band 230 and substantially reflective in pass-band 235. In another embodiment, optical combiner 165 is substantially reflective in pass-band 230 and substantially transparent in pass-band 235.

Figure 3A:
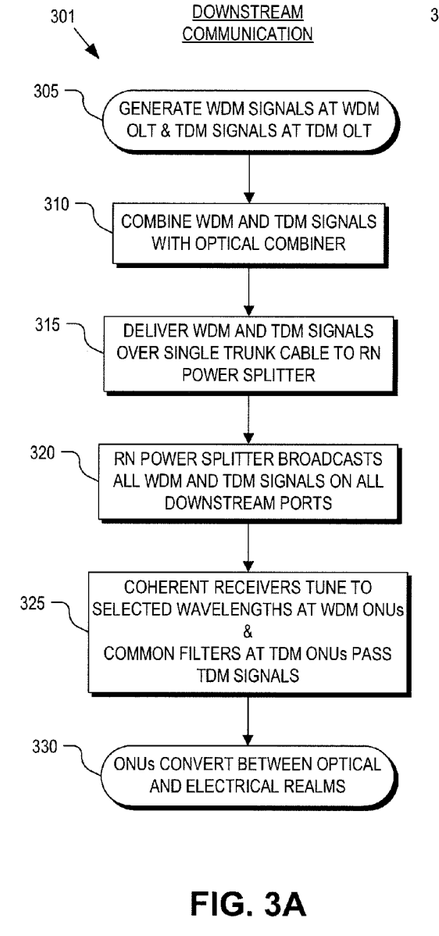
FIGS. 3A & 3B are flow charts illustrating a process of operating a hybrid PON including TDM optical network units ("ONUs") and WDM ONUs, in accordance with an implementation of the disclosure.
Figure 3B:
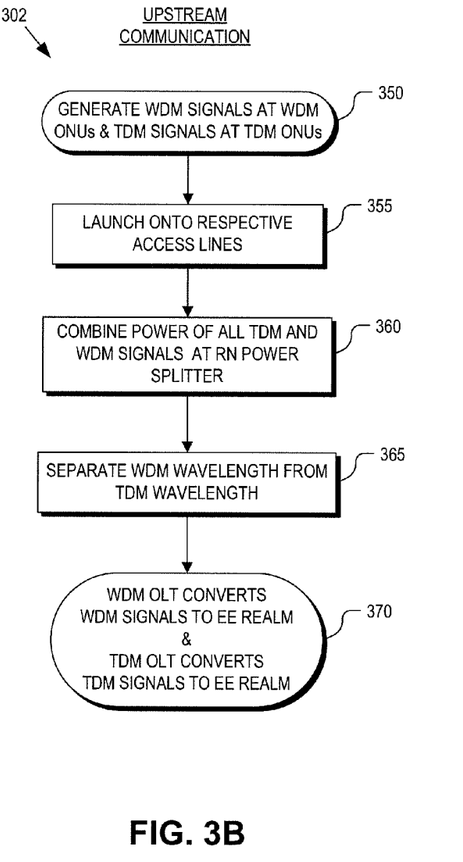

FIGS. 3A & 3B are flow charts illustrating processes of operation of hybrid PON system 100, in accordance with an implementation of the disclosure. FIG. 3A illustrates a process 301 for downstream flowing communications, while FIG. 3B illustrates a process 302 for upstream flowing communications. The order in which some or all of the process blocks appear in process 301 or 302 should not be deemed limiting. Rather, one of ordinary skill in the art having the benefit of the present disclosure will understand that some of the process blocks may be executed in a variety of orders not illustrated, or even in parallel.

In a process block 305, each OLT within CO 105 receives electrical signals from their respective MACs (e.g., pt-2-pt PON MAC 175 or TDM-PON MAC 190) and generates optical signals for launching into their respect sub-PONs. For example, WDM OLT 155 generates WDM signals (discussed in greater detail below in connection with FIG. 5) while TDM OLT 160 generates TDM signals. In a process block 310, optical combiner 165 combines the downstream WDM signals on WDM-PON wavelength grid 220 with the downstream TDM signal from TDM-PON wavelength grid 215 on trunk fiber strand 115. Trunk fiber strand 115 guides the downstream WDM and TDM signals from CO 105 to RN power splitter 120 (process block 315). In one implementation, RN power splitter 120 is a passive optical element that splits the power of the downstream optical signals received on its upstream port across all of its downstream optical ports. Thus, in a process block 320, RN power splitter 120 broadcasts all the downstream signals onto all of its downstream facing optical ports. In other words, both the downstream TDM signal and the downstream WDM signals are broadcast onto all downstream facing optical ports of RN power splitter 120.

Since the downstream WDM signals each support a virtual pt-2-pt link between CO 105 and WDM ONUs 145, each WDM ONU 145 includes a tunable optical receiver that selects the specific wavelength intended for the particular CP 150. In one implementation, the downstream WDM signals are phase modulated signals and the WDM ONUs 145 use coherent detection.

Correspondingly, since the downstream TDM signal is inherently a point-to-multipoint broadcast signal, a common TDM optical filter (not illustrated) is provided for all TDM ONUs 140 to pass the downstream TDM signal (process block 325). The common TDM optical filter is configured to pass the downstream (and upstream) TDM signal, but block all WDM-PON signals. The common TDM optical filters may also be positioned anywhere between TDM ONUs 140 and the downstream ports of RN power splitter 120; however, these filters are typically included within the TDM ONUs 140 themselves.

In a process block 330, the respective WDM ONUs 145 and TDM ONUs 140 receive and convert the downstream optical signals from the optical realm into the electrical realm for use by CPE.

Upstream communications are now described in connection with process 302 (FIG. 3B). In a process block 350, each individual CP 150 generates upstream data signals. For CPs 150 having a WDM ONU 145, the upstream data signals are converted to the optical realm using direct amplitude modulation onto a tunable carrier wavelength allocated to the particular CP 150 by the user's WDM ONU 145. Accordingly, WDM ONUs 145 should be capable of outputting upstream optical signals on the particular wavelength allocated to the user's upstream traffic, as allocated from the WDM-PON wavelength grid 220 (WDM ONU operation is discussed in greater detail below in connection with FIG. 8). For CPs 150 having a TDM ONU 140, the upstream data signals are converted to the optical realm, and signals from different TDM ONUs 140 are time multiplexed (scheduled) onto the upstream TDM wavelength. The optical upstream TDM and WDM signals are launched into access lines 125 (process block 355).

The upstream TDM and WDM signals are delivered to RN power splitter 120 via their respective access lines 125. In a process block 360, the optical power of each of these upstream signals is combined onto trunk fiber strand 115. Accordingly, RN power splitter 120 operates as a power combiner in the upstream direction.

The combined TDM and WDM signals are delivered to CO 105 along trunk fiber strand 115. At CO 105, optical combiner 165 operates to de-multiplex the upstream TDM signal from the upstream WDM signals (process block 365). In the illustrated implementation, the WDM signals are separated from the TDM signal and reflected towards WDM OLT 155, while the TDM signal passes through optical combiner 165 towards TDM OLT 160. Of course, in another implementation, the pass-bands of optical combiner 165 may be configured such that the WDM signals pass through optical combiner 165 while the TDM signals are reflected.

Finally, in a process block 370, WDM OLT 155 de-multiplexes the individual upstream WMD signals and converts them to the electrical realm using direct detection techniques. Similarly, TDM OLT 160 converts the upstream TDM signal to the electrical realm. Thus, the WDM PON uses an asymmetric modulation scheme. In the downstream direction phase modulation and coherent detection is used while in the upstream direction amplitude modulation and direct detection is used. This asymmetric modulation scheme leverages the benefits of increased sensitivity associated with coherent detection in the downstream direction with the benefits of reduced cost associated with direction detection in the upstream direction. This asymmetric modulation scheme is advantageous because it is economical to place optical amplifiers (e.g., Erbium Doped Fiber Amplifiers) in the upstream and downstream paths at CO 105 where they can be cost shared across multiple CPs 150, as opposed to including two such amplifiers at each CP 150. Since the amplification resides on the CO side, the asymmetric modulation scheme places the more sensitive coherent detectors on the CP side and the less expensive direct detection on the CO side. The asymmetric modulation scheme proposed herein enables a TDM PON and a WDM PON to co-exist within a single hybrid PON during a technological migration from TDM to WDM and strikes a cost efficient balance for operating the WDM PON.

Figure 4:
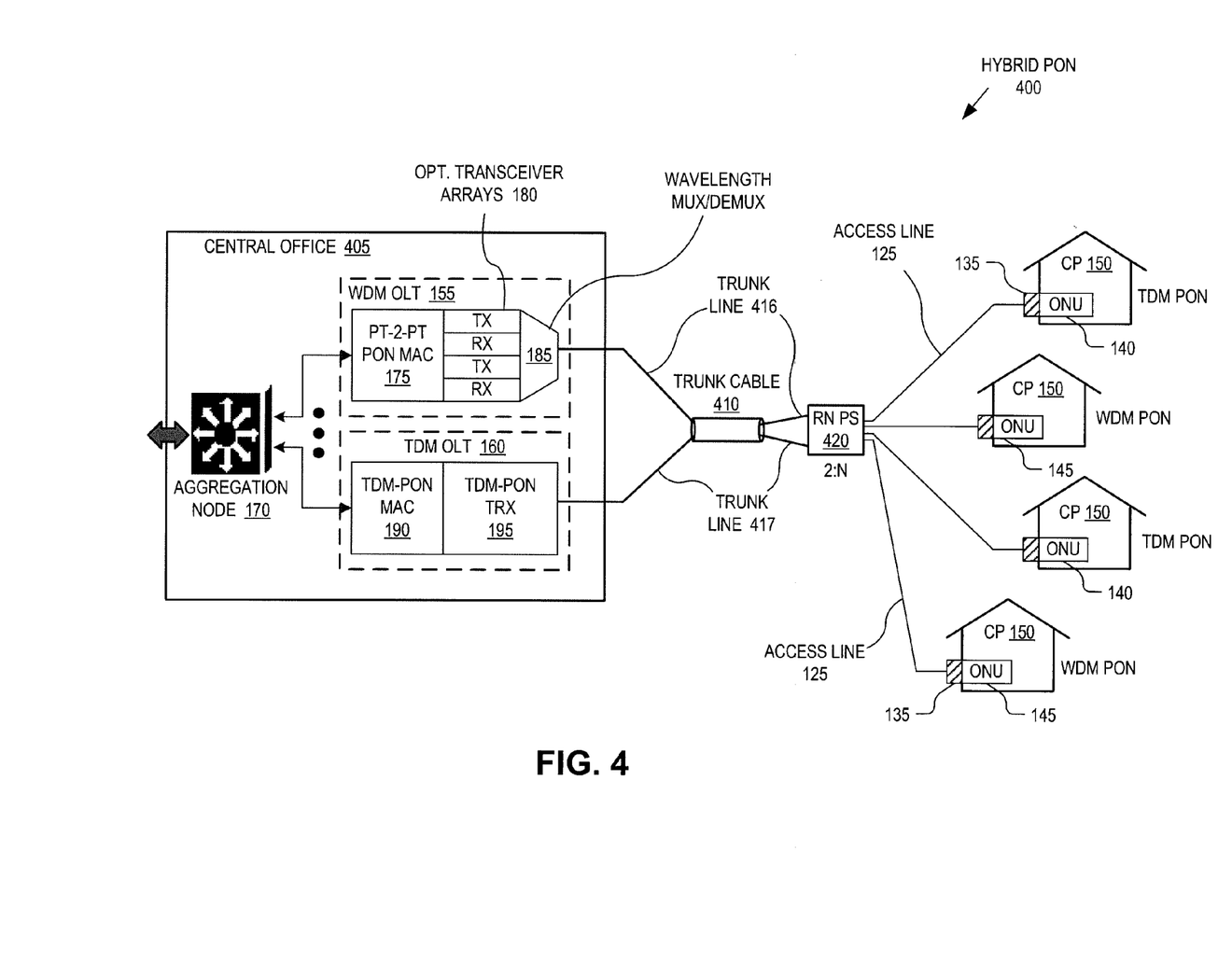
FIG. 4 is a functional block diagram illustrating a hybrid PON implemented with a 2:N remote node power splitter, in accordance with an implementation of the disclosure.

FIG. 4 is a functional block diagram illustrating a hybrid PON 400 implemented with a 2:N RN power splitter 420, in accordance with an implementation of the disclosure. Hybrid PON 400 is similar to hybrid PON system 100 with the following exceptions. Hybrid PON 400 is implemented with a 2:N RN power splitter 420 instead of a 1:N RN power splitter 120. By using a 2:N power splitter, two fiber trunk lines 416 and 417 are run to RN power splitter 420. Trunk line 416 links WDM OLT 155 to a first upstream port of RN power splitter 420 while the second trunk line 417 links TDM OLT 160 to a second upstream port of RN power splitter 420. While two trunk lines must be run between CO 405 and RN power splitter 420 within trunk cable 410 per pair of WDM OLT 155 and TDM OLT 160, this configuration avoids the need for optical combiner 165 by paying the penalty of doubling the fiber counts of trunk fiber 410. Both RN power splitter 120 and RN power splitter 420 may be implemented using a passive planar lightwave circuit ("PLC"); however, in the case of RN power splitter 120 the PLC is a 1:N optical device while in the case of RN power splitter 420 the PLC is a 2:N optical device.

Figure 5:
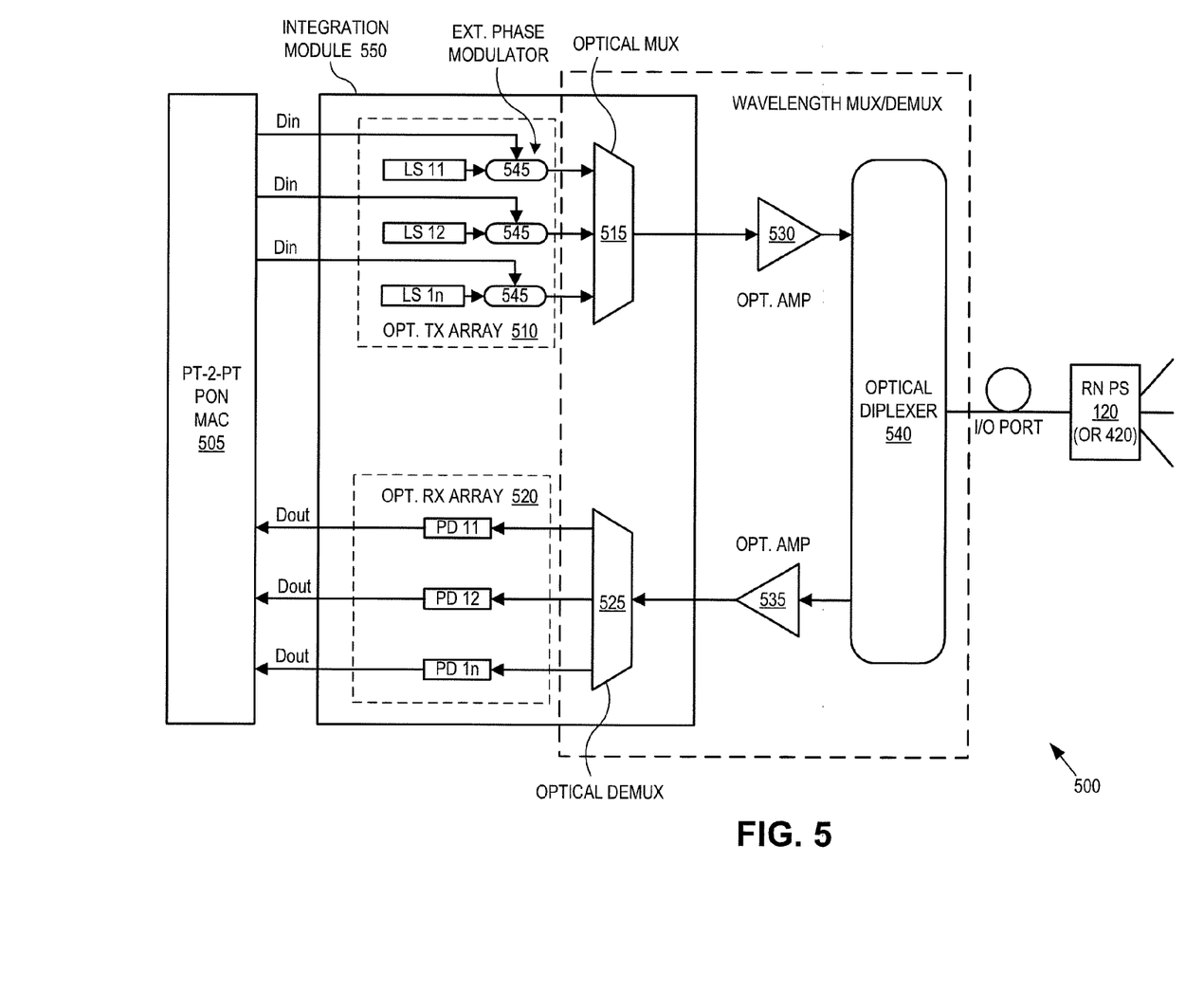
FIG. 5 is a functional block diagram illustrating a WDM optical line terminal ("OLT"), in accordance with implementations of the disclosure.

FIG. 5 is a functional block diagram illustrating a WDM OLT 500, in accordance with an implementation of the disclosure. WDM OLT 500 is one possible implementation of WDM OLT 155 illustrated in FIG. 1. The illustrated implementation of WDM OLT 500 includes a PT-2-PT PON MAC 505, an optical transmitter array 510, an optical MUX 515, an optical receiver array 520, an optical DEMUX 525, optional optical amplifiers 530 and 535, and an optical diplexer 540.

Collectively, optical MUX 515, optical DEMUX 525, and optical diplexer 540 functionally form a wavelength MUX/DEMUX for combining the downstream WDM signals onto the I/O port for launching into a PON (e.g., hybrid PON system 100) and for routing the upstream WDM signals received from a PON to the appropriate optical receiver (e.g., PD 11, PD 12 . . . PD 1n). These components collectively represent one possible implementation of wavelength MUX/DEMUX 185, illustrated in FIGS. 1 and 4.

The illustrated implementation of optical transmitter array 510 includes a plurality of laser sources (e.g., LS 11, LS 12 . . . LS 1n) each coupled to an external modulator 545. Each external modulator 545 is coupled to receive a data signal (Din) from PT-2-PT PON MAC 505 and to modulate the respective data signal onto the carrier wavelength received from its respective laser source in phase or amplitude or both. Phase modulation may be preferred because of its higher sensitivity. Optical MUX 515 includes a plurality of upstream ports each coupled to a corresponding one of the external modulators 545. Optical MUX 515 combines the various downstream WDM signals that are modulated onto different carrier wavelengths on a single optical link coupled to optical diplexer 540. In one implementation, this optical link includes optical amplifier 530 (e.g., EDFA) to amplify all of the downstream WDM signals together. Optical diplexer 540 directs the downstream WDM signals received from optical MUX 515 to its I/O port for delivery to RN PS 120 (or 420) as described in connection with FIGS. 1-4. Optical diplexer 540 may be implemented using a 3-dB power splitter, a three port optical circulator, a 2:1 interleaver, a band filter that separates upstream and downstream signals, or otherwise.

The illustrated implementation of optical receiver array 520 includes a plurality of photo-detectors (e.g., PD 11, PD 12 . . . PD 1n) each coupled to a respective output port of DEMUX 525. Optical diplexer 540 routes upstream WDM signals received on different carrier wavelengths to optical DEMUX 525, which in turn de-multiplexes the upstream WDM signals based upon their respective carrier wavelengths to the appropriate photo-detector. In one implementation, optical amplifier 535 (e.g., EDFA) is linked between optical diplexer 540 and optical DEMUX 525 to collectively amplify all the upstream WDM signals routed to optical DEMUX 525. In the illustrated implementation, the photo-detectors perform direct detection of information modulated on the amplitude of the upstream WDM signals. In one implementation, photo-detectors are implemented as photo-diodes (e.g., PIN or avalanche photo-diodes) coupled to trans-impedance amplifiers ("TIAs"). The upstream WDM signals are demodulated and converted to the electrical realm and output as data out (Dout) signals, which are coupled into PT-2-PT PON MAC 505.

Since WDM OLT 500 uses a coherent transmitter and phase modulation in the downstream direction, but direct detection circuitry and amplitude modulation in the upstream direction, WDM OLT 500 implements an asymmetric modulation scheme. The asymmetric modulation scheme leverages the respective advantages of coherent detection in the downstream direction and direct detection in the upstream direction. In implementations where the fiber runs between CO 105 and CPs 150 are sufficiently long so as to substantially benefit from in-line optical amplifiers (e.g., optical amplifiers 530 and 535), these amplifiers are positioned at CO 105 where they can be shared amongst all CPs 150—instead of a one or two amplifiers included in each ONU 145 on the CP side. Since it is often more beneficial to place optical amplification on the received side, the more expensive and sensitive coherent detection circuitry is saved for the CP side (where optical amplification is omitted since it cannot easily be shared across multiple CPs on the CP side), while the less expensive direction detection is used on the CO side, which can include shared optical amplification when necessary.

In one implementation, the optical transmitter array 510, optical receiver array 520, optical MUX 515, and optical DEMUX 525 may be combined into an integrated module 550 to reduce the manufacturing costs of the WDM OLT and to simplify in-field deployment. In one implementation, integrated module 550 is a single physical package that includes a photonic integrated circuit ("PIC"). The PIC may include both optical and electrical devices, such as laser diodes, photodiodes, driver circuits, TIAs, phase modulators, arrayed waveguide gratings ("AWG"), etc. In one implementation, optical MUX 515 and optical DEMUX 525 are implemented as a passive optical device, such as an AWG.

Figure 6:
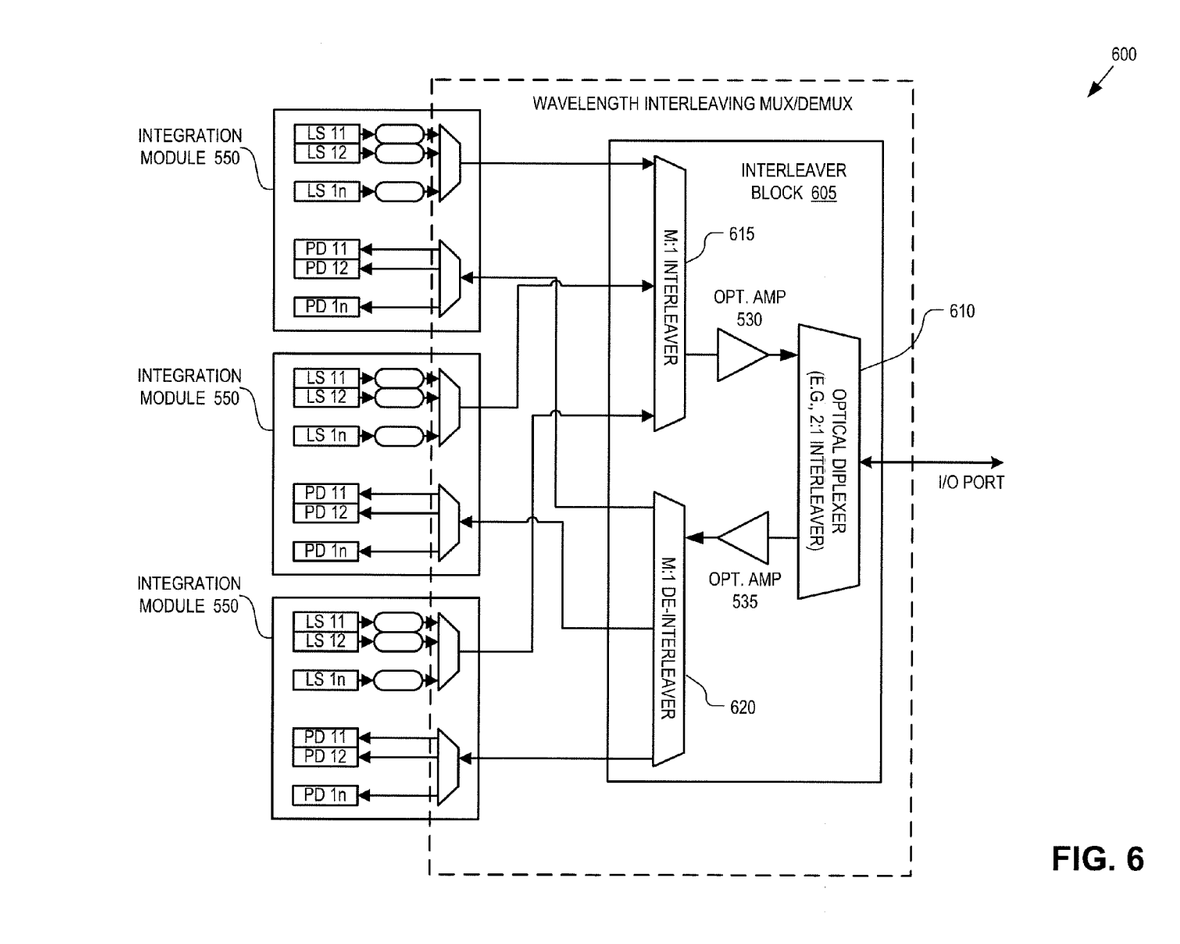
FIG. 6 is a functional block diagram illustrating the interleaving of WDM signals and how component integration at the WDM OLT provides a scalable architecture, in accordance with implementations of the disclosure.

FIG. 6 illustrates a WDM OLT 600, which uses multiple integrated modules 550 to provide scalability for expanding the number of CPs serviced, in accordance with an implementation of the disclosure. As the number of WDM CPs increases, integrated modules 550 can be added at the CO to accommodate the increased number of CP subscribers. To facilitate a plug-and-play upgrade, an interleaver block 605 may be used to connect integrated modules 550 to the PON. The illustrated implementation of interleaver block 605 includes an optical diplexer 610, an M:1 interleaver 615, an M:1 de-interleaver 620, and optical amplifiers 530 and 535. Optical diplexer 610 operates to multiplex the downstream WDM signals from the respective optical transmitters in integration modules 550 onto the I/O port for launching into the PON and operates to demultiplex or route the upstream WDM signals to the appropriate optical receiver based upon their carrier wavelengths. This optical multiplexing/de-multiplexing may be accomplished in an interleaving fashion where downstream and upstream carrier wavelengths are interleaved on a per CP basis, on a banding basis where upstream and downstream signals are separated into different red/blue bands, or otherwise. Interleaving can serve to widen the interchannel spacing that must be optically multiplexed/de-multiplexed by a given optical MUX 515 or DEMUX 525, thereby reducing fabrication costs and structure size associated with AWGs. For example, WDM-PON wavelength grid 220 may call for 50 GHz channel spacing between adjacent upstream and downstream WDM channels, 100 GHz channel spacing between adjacent upstream WDM channels, and 100 GHz channel spacing between adjacent downstream WDM channels, while interleaver block 605 may interleave the wavelengths such that each optical MUX 515 and optical DEMUX 525 need only multiplex or de-multiplex channels spaced 400 GHz apart. Of course other interleaving combinations may be used. Optical diplexer 610 may be implemented as a 3-dB power splitter, a three port optical circulator, a 2:1 interleaver, a band/filter that separates upstream and downstream signals, or otherwise.

Figure 7:
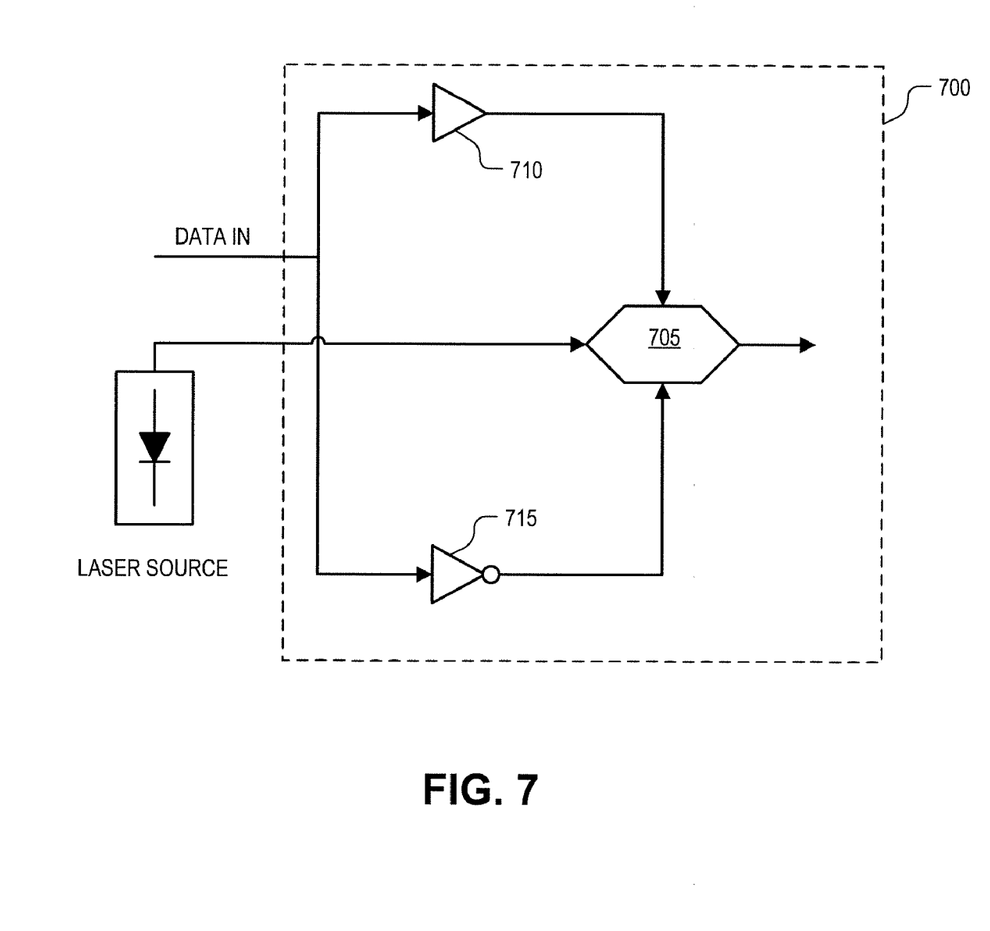
FIG. 7 is a functional block diagram illustrating an external phase modulator for generating downstream WDM signals of a WDM PON, in accordance with an implementation of the disclosure.

FIG. 7 is a functional block diagram illustrating an external phase modulator 700 for generating downstream WDM signals of a WDM PON, in accordance with an implementation of the disclosure. External phase modulator 700 is one possible implementation of external modulators 545. The illustrated implementation of external phase modulator 700 includes an optical phase modulator 705 and drivers 710 and 715. Optical phase modulator 705 may be implemented using an electro-optic modulator to encode a phase modulation onto the carrier wavelength output by the laser source. In one implementation, optical phase modulator 705 is a Mach-Zhender ("MZ") modulator that uses binary phase shift keyed ("BPSK") digital modulation for coherent transmission of downstream WDM signals. The MZ and BPSK combination reduces the circuit complexity relative to a full blown coherent optical transmitter used for long haul WDM transmission systems, which typically include a pair of polarization multiplexed I-Q modulators and digital encoders. Such systems achieve increased spectral efficiency by using both polarizations and both quadratures in each polarization for signal encoding. However, such systems are also complex and currently expensive for large scale integration. The illustrated implementation of external phase modulator 700 trades off spectral efficiency for cost, power, and space savings. However, it is contemplated that in the future, arrays of dual-polarization quadrature amplitude modulation ("QAM") modulators may eventually be realized at competitive costs, power, and space requirements to be incorporated into the architecture disclosed herein.

Figure 8:
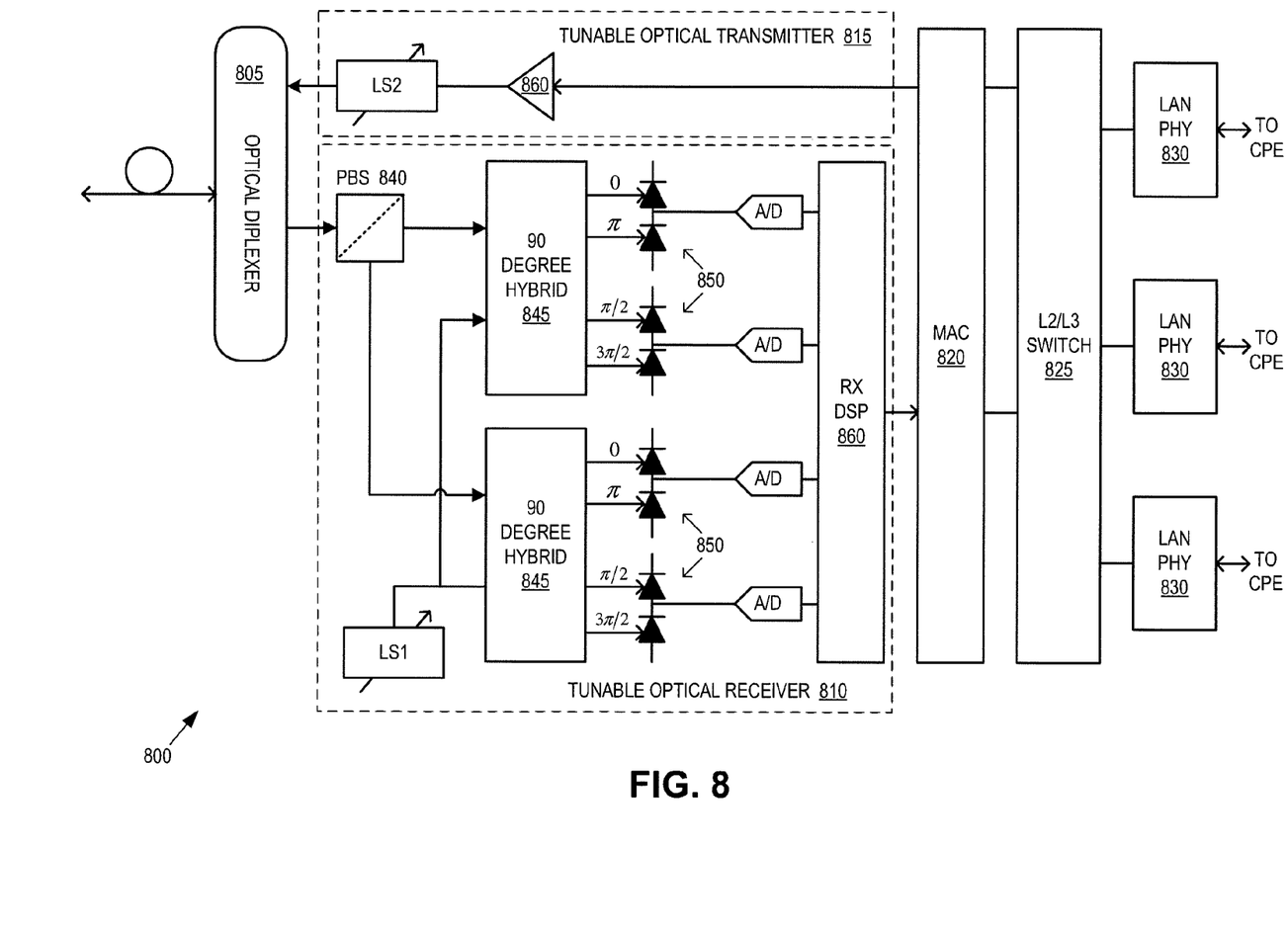
FIG. 8 is a functional block diagram illustrating a colorless ONU of a WDM PON, in accordance with an implementation of the disclosure.

FIG. 8 is a functional block diagram illustrating a colorless WDM ONU 800, in accordance with an implementation of the disclosure. WDM ONU 800 represents one possible implementation of WDM ONUs 145 illustrated in FIGS. 1 and 4. The illustrated implementation of WDM ONU 800 includes an optical diplexer 805, a tunable optical receiver 810, a tunable optical transmitter 815, a MAC 820, a switch 825, and one or more local area network ("LAN") physical units (PHYs) 830. The illustrated implementation of tunable optical receive 810 includes a tunable laser source LS1, a polarization beam splitter ("PBS") 840, two 90 degree hybrids 845, balanced photo-receivers 850, analog-to-digital converters A/D, and receive digital signal processing logic 860. The illustrated implementation of tunable optical transmitter 815 includes a tunable laser source LS2 and driver circuitry 860. Optical diplexer 805 may be implemented as 3-dB power splitter, a three port optical circulator, a cyclical comb filter if the upstream and downstream wavelength are interleaved, a red/blue band filter if the upstream and downstream WDM signals use different bands (e.g., C-band for upstream and L-band for downstream), or otherwise.

WDM ONU 800 includes a coherent receiver that uses coherent detection of a phase modulated signal in the downstream direction and includes a directly modulated transmitter that uses amplitude modulation for upstream signals. In the upstream direction, tunable optical transmitter 815 is capable of launching upstream WDM signals with a selectable carrier wavelength via appropriate tuning of tunable laser source LS2. The information is then directly amplitude modulated onto the selected carrier wavelength. WDM ONU 800 also includes a colorless or wavelength agnostic optical receiver that is compatible with a TDM sub-PON in a hybrid PON system by using a broadcast-and-select approach in the downstream direction. In other words, tunable optical receiver 810 is capable of tuning to a specific carrier wavelength and rejecting the other carrier wavelengths allocated to other WDM ONUs in the PON. The illustrated implementation of tunable optical receiver 810 implements its tunable functionality using laser source LS1 as a local oscillator (LO) to create a selectable beat wavelength for down mixing the selected carrier wavelength. Tunable optical receiver 810 includes coherent receiver circuitry that may implement homodyne, heterodyne, or intradyne coherent detection. In one implementation, LS1 and LS2 are identical laser sources. In one implementation, LS1 and LS2 are identical tunable laser sources integrated into a single package for space and cost efficiency.

It is also noteworthy that the LO at the tunable receiver may also serve as an amplifier to amplify the received signal from the OLT at the ONU, thus obviating the need for an EDFA at the CP.

Tunable optical receiver 810 is a coherent optical receiver that uses PBS 840 to split received downstream WDM signals into X and Y polarizations. Each polarization is mixed with the LO signal in the 90 degree hybrid 845. This mixing generates an in-phase and quadrature phase outputs that are detected by pairs of balanced receivers 850. Even though only one polarization may be used by the transmitter in the WDM OLT, the polarization of the downstream WDM signals in unpredictable at tunable optical receiver 810 due to polarization rotation, which occurs during fiber transmission. Therefore, polarization diversity is used at the coherent receiver. Nevertheless, since just one receiver is used on the CP side, as opposed to an array of receivers on the CO side, integration complexity is manageable. Following the 4 balanced receivers 850 are A/D converters and receiver DSP logic 860 to recover the transmitted phase and/or amplitude information depending on the modulation scheme used at the OLT. In one implementation, a simple coherent modulator which can be easily manufactured into arrays at the OLT and has a high signal to noise ratio (SNR) tolerance is a binary phase modulator.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An apparatus for a passive optical network ("PON"), the apparatus comprising:
    a wavelength-division multiplexing ("WDM") optical line terminal ("OLT") for delivering communication services to customer premises ("CPs") via an asymmetric modulation scheme using WDM signals, wherein the WDM OLT includes:
        a plurality of physical photonic integrated circuits ("PIC") for coupling to the PON to provide the communication services to the CPs, wherein each physical PIC includes:
            an optical transmitter array including a plurality of coherent transmitters to generate downstream WDM signals encoded using phase modulation; and
            an optical receiver array including a plurality of direct detection photo-detectors to receive upstream WDM signals encoded with amplitude modulation; and
        an optical diplexer optically coupled to the optical transmitter arrays and the optical receiver arrays of the physical PICs, the optical diplexer for directing wavelengths of the upstream and downstream WDM signals over a single fiber and coupling the WDM OLT to a remote node power splitter via one or two fiber trunk lines to deliver the downstream WDM signals from the optical transmitter arrays to the PON and to deliver the upstream WDM signals from the PON to the optical receiver arrays.

2. The apparatus of claim 1, wherein each physical PIC further includes:
    an optical multiplexer coupled between the optical transmitter array and the optical diplexer to multiplex the downstream WDM signals each having a different wavelength onto a first optical link; and
    an optical demultiplexer coupled between the optical diplexer and the optical receiver array to de-multiplex the upstream WDM signals each having a different wavelength to respective ones of the direct detection photo-detectors each having a different wavelength sensitivity.

3. The apparatus of claim 2, wherein the upstream and downstream WDM signals are separated into two different wavelength bands, each of which is further separated into M sub-bands, wherein each of the M sub-bands is served by a corresponding one of the plurality of physical PICs.

4. The apparatus of claim 2, wherein each of the plurality of physical PICs services a portion of the upstream WDM signals and a portion of the downstream WDM signals.

5. The apparatus of claim 2, wherein the WDM OLT interleaves wavelengths per CP such that a given pair of upstream and downstream WDM signals assigned to a given CP are adjacent carrier wavelengths within a WDM PON wavelength grid, the apparatus further comprising:
    an M:1 interleaver having M input ports coupled to M of the optical multiplexers; and
    an M:1 de-interleaver having M output ports coupled to M of the optical de-multiplexers,
    wherein the optical diplexer couples the M:1 interleaver and the M:1 de-interleaver to an input/output port of the WDM OLT.

6. The apparatus of claim 5, wherein each of the optical multiplexers multiplexes a portion of the downstream carrier wavelengths having a first wavelength spacing that is greater than a second wavelength spacing of the downstream carrier wavelengths of the WDM PON wavelength grid and wherein the M:1 interleaver is coupled to combine the downstream carrier wavelengths from a plurality of the optical multiplexers to provide the second wavelength spacing of the downstream carrier wavelengths of the WDM PON wavelength grid.

7. The apparatus of claim 2, further comprising:
    a shared upstream optical amplifier coupled between the optical diplexer and the optical demultiplexer to optically amplify the upstream WDM signals for all of the CPs serviced by the WDM OLT.

8. The apparatus of claim 7, further comprising:
    a shared downstream optical amplifier coupled between the optical multiplexer and the optical diplexer to optically amplify the downstream WDM signals for all of the CPs serviced by the WDM OLT.

9. The apparatus of claim 8, wherein the upstream optical amplifier and the downstream optical amplifier comprise Erbium Doped Fiber Amplifiers.

10. The apparatus of claim 2, wherein the optical multiplexer comprises a first arrayed waveguide grating ("AWG") and the optical demultiplexer comprises a second AWG.

11. The apparatus of claim 1, wherein the plurality of coherent transmitters each comprises:
    a laser source to generate a carrier signal having a carrier wavelength; and
    an external phase modulator optically coupled to the laser source to phase modulate the carrier signal with a data signal using binary phase shift keying to generate a given downstream WDM signal.

12. The apparatus of claim 1, wherein the PON comprises a hybrid PON including a WDM sub-PON and a time division multiplexing ("TDM") sub-PON, wherein the WDM OLT is coupled to the WDM sub-PON, the apparatus further comprising:
    a TDM OLT coupled to the TDM sub-PON, wherein the WDM OLT and the TDM OLT are optically coupled to share the one or two fiber trunk lines and to share the remote node power splitter such that the downstream WDM signals and downstream TDM signals are broadcast to all of the CPs coupled to both the WDM sub-PON and the TDM sub-PON.

13. An apparatus for a passive optical network ("PON"), the apparatus comprising:
- a wavelength-division multiplexing ("WDM") optical network unit ("ONU") for delivering communication services to customer premise equipment from the PON, the WDM ONU including:
  - a tunable optical transmitter to launch upstream WDM signals into the PON, the tunable optical transmitter including a first tunable laser source coupled to generate a selectable upstream carrier wavelength and direct amplitude modulation circuitry coupled to amplitude modulate the first tunable laser source; and
  - a tunable optical receiver to receive downstream WDM signals from the PON, the tunable optical receiver including coherent detection circuitry to demodulate phase information from the downstream WDM signals and a second tunable laser source operated as a local oscillator and coupled to tune to a selectable downstream carrier wavelength, wherein the tunable optical receiver further includes:
    - a polarizing beam splitter ("PBS") including an upstream port for coupling to the PON;
    - a first 90 degree hybrid coupled to a first output of the PBS to receive a first polarization of the downstream WDM signals and coupled to the second tunable laser source to receive a tunable beat signal;
    - a second 90 degree hybrid coupled to a second output of the PBS to receive a second polarization of the downstream WDM signals and coupled to the second tunable laser source to receive the tunable beat signal; and
    - first and second pairs of balanced photo-receivers coupled to outputs of the first and second 90 degree hybrids, respectively, and wherein each of the first and second pair of balanced photo-receivers includes four photodiodes.

14. The apparatus of claim 13, wherein the first tunable laser source and the second tunable laser source are substantially identical.

15. The apparatus of claim 14, wherein the first and second tunable laser sources are integrated into a single physical package.

16. The apparatus of claim 13, wherein the WDM ONU further comprises:
- an optical diplexer including an upstream input/output ("I/O") port for coupling to the PON and two downstream ports for coupling to the tunable optical transmitter and the tunable optical receiver, respectively, the optical diplexer to deliver the upstream WDM signals from the tunable optical transmitter to the upstream I/O port and to deliver the downstream WDM signals from the upstream I/O port to the tunable optical receiver.

17. The apparatus of claim 16, wherein the optical diplexer comprises one of a 3-dB power splitter, a three port optical circulator, a cyclical comb filter, or a band filter that separates upstream wavelengths from downstream wavelengths.

18. The apparatus of claim of claim 13, wherein the tunable optical receiver further comprises:
- analog-to-digital ("A/D") conversion circuitry coupled to each balanced photo-receiver of each of the first and second 90 degree hybrids; and
- receive digital signal processing circuitry coupled to the A/D conversion circuitry.

19. The apparatus of claim 13, wherein the PON comprises a hybrid PON that broadcasts WDM signals and time division multiplexing ("TDM") signals to all customer premises, wherein the WDM ONU further includes:
- an optical filter to block one or more wavelengths associated with the TDM signals.

20. A hybrid passive optical network ("PON"), comprising:
- a time-division multiplexing ("TDM") optical line terminal ("OLT") for delivering communication services to a first group of customer premises ("CPs") via TDM signals;
- a wavelength-division multiplexing ("WDM") OLT for delivering the communication services to a second group of CPs via WDM signals, the WDM OLT including first asymmetric modulation circuitry for upstream and downstream WDM signals, wherein the WDM OLT further includes:
  - a plurality of physical photonic integrated circuits ("PIC") for coupling to the second group of CPs, wherein each physical PIC includes:
    - an optical transmitter array including a plurality of coherent transmitters to generate the downstream WDM signals encoded using phase modulation; and
    - an optical receiver array including a plurality of direct detection photo-detectors to receive the upstream WDM signals encoded with amplitude modulation;
- a remote node power splitter coupled to receive the TDM signals and the WDM signals and to broadcast both the TDM signals and the WDM signals on all ports of the remote node power splitter facing towards the first and second groups of CPs;
- TDM ONUs disposed at the first group of CPs to communicate with the TDM OLT via the TDM signals; and
- WDM ONUs disposed at the second group of CPs to communicate with the WDM OLT via the WDM signals, wherein the WDM ONUs are colorless transceivers including second asymmetric modulation circuitry for the upstream and downstream WDM signals.

21. The hybrid PON of claim 20, wherein the WDM OLT further comprises:
- an optical diplexer optically coupled to the optical transmitter arrays and the optical receiver arrays of the physical PICs, the optical diplexer for coupling the WDM OLT to the remote node power splitter.

22. The hybrid PON of claim 20, wherein the WDM ONU comprises:
- a tunable optical transmitter to launch the upstream WDM signals into the PON, the tunable optical transmitter including a first tunable laser source coupled to generate a selectable upstream carrier wavelength and direct amplitude modulation circuitry coupled to amplitude modulate the first tunable laser source;
- a tunable optical receiver to receive the downstream WDM signals from the PON, the tunable optical receiver including coherent detection circuitry to demodulate phase information from the downstream WDM signals and a second tunable laser source operated as a local oscillator and coupled to tune to a selectable downstream carrier wavelength.

* * * * *